(12) United States Patent
Sun et al.

(10) Patent No.: US 6,993,196 B2
(45) Date of Patent: Jan. 31, 2006

(54) DIGITAL IMAGE STORAGE METHOD

(75) Inventors: Zhaohui Sun, Rochester, NY (US); Alexander C. Loui, Penfield, NY (US); James S. Warnick, Loves Park, IL (US)

(73) Assignee: Eastman Kodak Company, Rochester, NY (US)

( * ) Notice: Subject to any disclaimer, the term of this patent is extended or adjusted under 35 U.S.C. 154(b) by 637 days.

(21) Appl. No.: 10/100,438

(22) Filed: Mar. 18, 2002

(65) Prior Publication Data

US 2003/0174893 A1 Sep. 18, 2003

(51) Int. Cl.
*G06K 9/36* (2006.01)

(52) U.S. Cl. .................... 382/233; 382/232; 382/246
(58) Field of Classification Search ................ 382/232, 382/305, 303, 233, 246, 254; 712/18, 209, 712/201, 1; 341/65; 710/68; 84/622, 645; 358/1.9; 386/95; 370/441; 719/314
See application file for complete search history.

(56) References Cited

U.S. PATENT DOCUMENTS

| | | | | |
|---|---|---|---|---|
| 3,686,641 A | * | 8/1972 | Logan et al. ............... 719/314 |
| 4,779,265 A | * | 10/1988 | O'Connor et al. ........... 370/441 |
| 5,659,726 A | | 8/1997 | Sandford, II et al. ........ 717/101 |
| 5,734,119 A | * | 3/1998 | France et al. ................. 84/622 |
| 5,764,987 A | | 6/1998 | Eidt et al. .................... 717/100 |
| 5,784,631 A | * | 7/1998 | Wise ........................... 382/246 |
| 5,799,111 A | * | 8/1998 | Guissin ........................ 382/254 |
| 5,805,914 A | * | 9/1998 | Wise et al. ................... 382/232 |
| 5,875,249 A | | 2/1999 | Mintzer et al. ................ 380/54 |
| 5,881,301 A | * | 3/1999 | Robbins ......................... 712/1 |
| 5,915,027 A | | 6/1999 | Cox et al. ...................... 380/54 |
| 6,006,231 A | | 12/1999 | Popa ........................... 707/101 |
| 6,016,491 A | | 1/2000 | Kou ............................... 707/9 |
| 6,021,250 A | * | 2/2000 | Hyodo et al. ................. 386/95 |
| 6,037,984 A | | 3/2000 | Isnardi et al. ........... 375/240.21 |
| 6,072,586 A | | 6/2000 | Bhargava et al. ........... 358/1.15 |
| 6,104,826 A | | 8/2000 | Nakagawa et al. .......... 382/100 |
| 6,128,736 A | | 10/2000 | Miller ......................... 713/176 |
| 6,282,311 B1 | | 8/2001 | McCarthy et al. ........... 382/162 |
| 6,330,666 B1 | * | 12/2001 | Wise et al. ................... 712/300 |
| 6,574,742 B1 | * | 6/2003 | Jamroga et al. ............. 713/400 |
| 6,809,836 B1 | * | 10/2004 | Nobuta et al. ................ 358/1.9 |
| 6,816,616 B2 | * | 11/2004 | Teng ........................... 382/232 |

FOREIGN PATENT DOCUMENTS

EP 0577327 * 1/1994

OTHER PUBLICATIONS

Cox et al., "An Efficient Adaptive Circular Viterbi Algorithm for Decoding Generalized Tailbiting Convolutional Codes", IEEE, vol. 43 No. 1, Feb. 1994, pps. 57-68.*

* cited by examiner

*Primary Examiner*—Anh Hong Do
(74) *Attorney, Agent, or Firm*—Thomas H. Close

(57) ABSTRACT

A method of storing a digital image file, includes the steps of: storing a header defined by a standard; storing image data encoded according to the standard after the header; and storing an image tail containing non-standard meta-data at the end of the image data.

19 Claims, 1 Drawing Sheet

DIGITAL IMAGE STORAGE METHOD

FIELD OF THE INVENTION

The invention relates generally to the field of digital image storage and more particularly to the representation and description used to store digital image data.

BACKGROUND OF THE INVENTION

There are a number of standardized descriptions for digital image data such as JPEG, GIF, BMP, EXIF, PCD, TIFF, etc. Every standard digital file format specifies a set of standard descriptions, such as image width, height, bits per pixel, number of layers, etc. A specific decoder is needed to decode image data that is encoded in each standard description. A standard specifies a set of standard descriptions such that all parties speak the same language and can communicate with each other. However, there is always a tradeoff between the standard complexity and the descriptive power of the standard. A simple standard such as PGM may only specify the image dimension and the magic number (a number of bytes indicating a PGM format), enough for decoding the raw data. While other standards, such as JPEG2000, may specify far more complicated descriptions and description schemes to enable more functionality. In practice, to limit the complexity of an image decoder, a standard with a limited number of descriptors is preferred.

Any image descriptors outside the scope of a digital image standard are called non-standard descriptions. It is not possible to describe an image for every foreseeable task by only using a standard description. For example, many standard image file formats do not specify if there are human faces in the image. This data may be useful for some applications. For another example, the date and time information is part of the standard image header of a TIFF image, but it is a non-standard description for a BMP image. Also digital audio can be embedded as standard description in EXIF image files, but it is non-standard for JPEG, GIF, TIFF, BMP, etc. It will be appreciated that non-standard descriptions can be very helpful for many task-dependent and user-dependent applications. There has been great effort on standardizing image description. The goal is to come up with a set of standard descriptions for a still image so that the image is exchangeable across a variety of media and systems. JPEG and EXIF are the typical examples. New file formats are invented to accommodate more standard descriptions in image headers, such as the metadata encoded by XML in EXIF.

The prior art fails to address how to use both standard and non-standard descriptions in a self-contained digital file for complete and enhanced image description and still make the non-standard descriptions compatible with the widely adopted standard image decoders. There is a need therefore for an improved image description method that can use both standard and non-standard descriptions in a self-contained digital file for complete and enhanced image description and still make the non-standard descriptions compatible with the widely adopted standard image decoders.

SUMMARY OF THE INVENTION

The need is met according to the present invention by providing a method of storing a digital image file that includes the steps of: storing a header defined by a standard; storing image data encoded according to the standard after the header; and storing an image tail containing non-standard meta-data at the end of the image data.

ADVANTAGES

The present invention has the following advantages. It provides self-contained extra description, called an image tail, after the image header and body. It is compatible with most of the widely adopted image file formats and decoders, as they will ignore the image tail, not reading or interpreting it. Therefore, there is no need of modification on the current imaging systems. The data contained within the image tail can be extracted by enhanced decoders, which are aware of the extra information embedded at the end of an image file and know how to interpret it. The image tail can be used to hold non-standard, optional and application-/user-dependent image description. The image tail can be used to build better imaging systems, from image taking, processing, rendering, description, management, organization to photo finishing.

DETAILED DESCRIPTION OF THE INVENTION

In the following description, a preferred embodiment of the present invention will be described in terms that would ordinarily be implemented as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
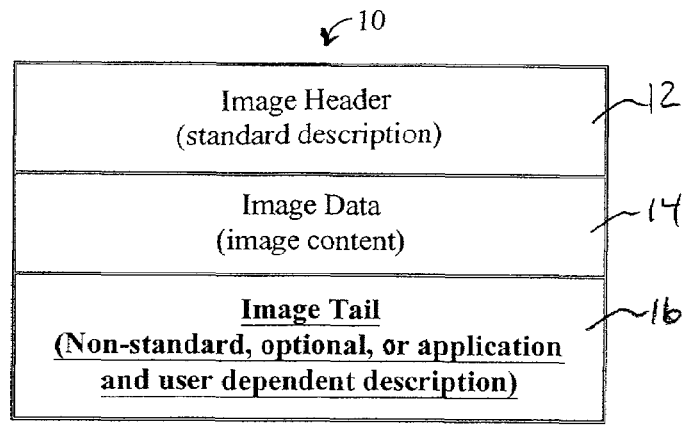
FIG. 1 is a diagram showing an image description including an image tail according to the present invention.

As shown in FIG. 1, an image description 10 according to the present invention includes an image header 12 and image data 14 as are known in a standard digital image representation. Image data 14 may be represented as raw or compressed data depending on the standard.

The image header 12, located at the beginning of the image data 14 indicates how to interpret the image data 14. The image header 12 normally includes descriptions of image format, size, colormap, coding scheme, or other metadata. A standard decoder can read the image header 12, extract the metadata from the header and decode the image data 14 accordingly, regardless of the image source and the implementation of the encoder.

According to the present invention, extra information called an image tail 16 which contains non-standard metadata is included in the image description 10 after the image data 14. The image tail 16 can include any non-standard, optional and application-/user-dependent description, such as digital audio or image data compression residue, can be put in image tail 16.

The existence of an image tail 16 in the image description is compatible with most standard image file formats. When an image tail is embedded at the end of a standard image file, most of the popular image decoders will ignore the extra bits in the image tail, not reading or interpreting them. Many image formats have markers indicating the beginning and end of an image file. For example, a JPEG standard image starts with 0xFFD8 and ends with 0xFFD9. Any data after the end marker will be ignored. Similarly an EXIF standard image uses 0xFFE0 and 0xFFEF as the start and end markers, and any data after the end marker is ignored. Some image formats, such as BMP, specifies the starting address and the size of the image data.

The standard decoders can stop reading as soon as the whole image data is read in and decoded, or can read the data in the image tail without any attempt to interpret it. Therefore most current standard imaging encoder/decoders are completely unaffected by the addition of an image tail. The additional information will not cause the image decoders to crash. Examples of standard decoders that are not affected by attaching an image tail include JPEG and GIF, the most popular image file formats used on the Internet. The image encoders/decoders contained in application programs such as ImageMagick, XV3.10, Adobe Photoshop and Paint Shop Pro 3.12-32 that are not affected by the existence of an image tail include:

| | |
|---|---|
| * BMP | Microsoft Windows bitmap image file; |
| * DIB | Microsoft Windows bitmap image file; |
| * EXIF | Exchangeable Image File; |
| * GIF | CompuServe graphics interchange format; 8-bit color (including 87a); |
| * JPEG | Joint Photographic Experts Group JFIF format; |
| * PCD | Photo CD; and |
| * TIFF | Tagged Image File Format. |

Figure 2:
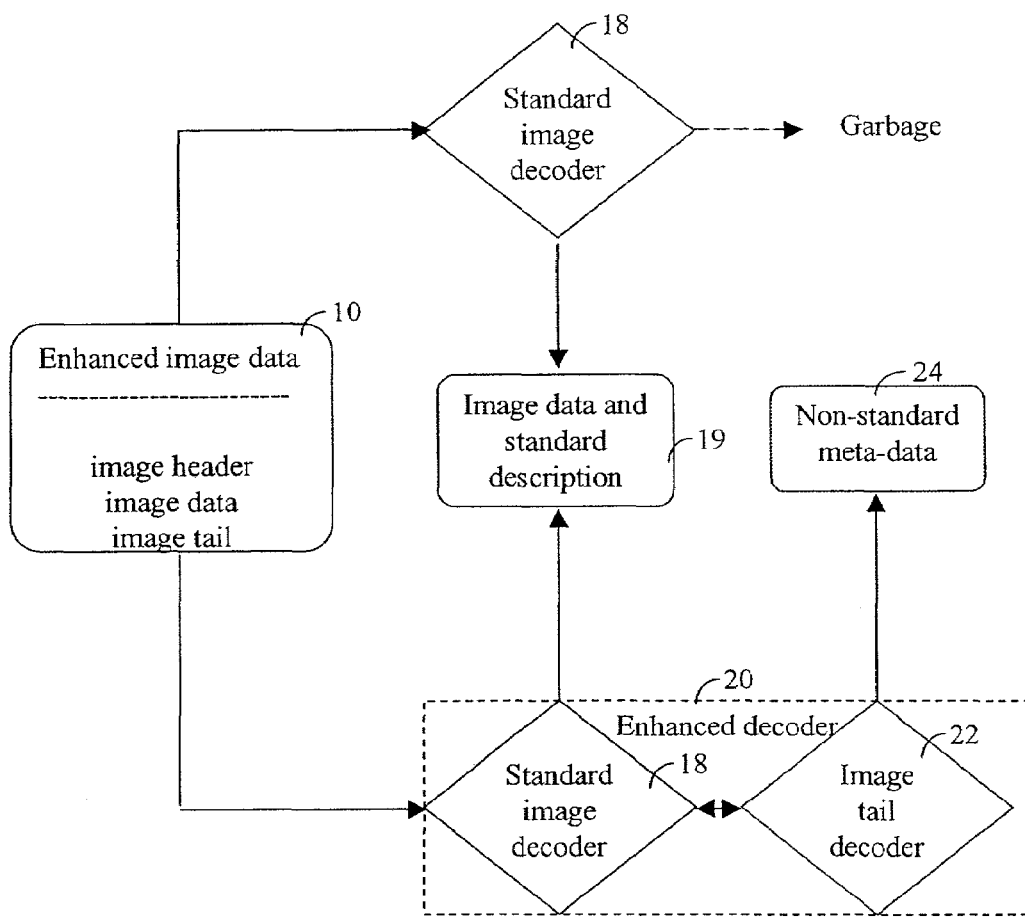
FIG. 2 is a block diagram of an enhanced image decoding system capable of decoding a non-standard description from an image tail according to the present invention.

Referring to FIG. 2, an image description 10 having an image tail 16 according to the present invention can be decoded using either a standard image decoder 18 to produce image data and a standard description 19, the image tail being ignored by the standard image decoder 18. Alternatively, the image description 10 can be decoded using an enhanced decoder 20 that includes a standard image decoder 18 to produce the image data and standard description 19, and an image tail decoder 22 to produce a non-standard meta-data 24 from the image tail 16. Image tail decoder 22 can be, for example an audio or image data compression residue decoder.

To detect the existence of a tail, such as digital audio or compression residue in the image description, the end of image data and end-of-file (EOF) are checked to see whether they are the same address or not. The end of image data is detected by a special marker/tag like 0xFFD9 in JPEG file, or by using metadata in the header 12, such as image and colormap size, in a BMP file to compute the end of the image data. When a file stream comes to the end of a file, an end-of-file (EOF) is returned. If the end of image data appears before the EOF, we know that there is an image tail, such as a digital audio or compression residue data.

Some standards also have extra space in the image header 12. This extra space can also be used to set a flag or marker to indicate the existence of image tail. The image tail decoder 22 can check to see if this flag has been set to determine if an image tail is present in the image description.

After locating the starting address of the image tail, the image tail decoder 22 decodes the image tail 16. A lot of useful information, such as digital audio and image data compression residue can be embedded in an image tail and used for enhanced image description. The enhanced decoder 20 looks for information beyond the image header and image data, and interprets as much as possible from the image tail. To insure that the image tail decoder doesn't crash the system, whenever it fails to interpret a block of data, it ignores that block of data and moves on to the other parts of the image tail.

In one embodiment of the present invention, the image tail contains digital audio data. Examples of digital audio data in an image tail can be speech annotation, background sound, music, radio broadcasting, or other audio signals associated with the image data. Speech annotations associated with an image might be captured with a digital camera, and may be conveniently stored in the same image file as non-standard descriptions of an event, such as who, when, where, etc. The audio data can be stored in any standardized audio format, such as Microsoft wave file, MPEG audio (mp3), Sun/NeXT au file, Apple/SGI aiff file, voc file etc. The image tail decoder, would therefore be a standard decoder for decoding the standard audio format.

According to an alternative embodiment of the invention, the image tail contains image data compression data. The compression residue in the image tail can be used to improve image quality. Any differences between the original image and the compressed image can be stored there. It can be used to improve color gamut, quantization precision, pixel layers, etc. Users can easily decode the compressed data first, then extract the compression residue with some extra effort, all from a single image file. An image tail can also contain image color space compression residuals such as those described in commonly assigned U.S. Pat. No. 6,282,311, issued Aug. 28, 2001 to McCarthy et al. When an image tail contains such image color space residual information, conversion back to an original extended gamut color space, such as CIELAB, from a reduced gamut color space, such as video RGB, is possible using the information contained within the single enhanced image description shown in FIG. 1.

An image tail can also contain a description of a different file format. Using this data, digital audio and image data compression residue in an image tail can be used to make image files backward compatible by embedding a standard descriptions of the latest image file format (such as EXIF) in another relatively older image file format (such as JPEG and GIF). In other words, the standard description for one format can be non-standard data in another format. To make a newer format backward compatible with an older format, the description of the new format can be included as an image tail in an older format. For example, the standard description in the header of EXIF can be embedded in the image tail of JPEG or GIF as a non-standard description, which greatly enhances its description power.

Digital audio or image data compression residue in an image tail can grow or be truncated depending on the applications. An application can choose to extract and truncate the digital audio or compression residue in image tail, therefore cut down the file size, or choose to embed more audio scripts in image tail.

One possible data structure for an image tail is as follows:

1) The beginning and the end of image tail are specified by special markers (e.g. 0xabcd, 0xdcba).

2) The data inside image tail is divided into packets.

3) The first packet serves as the table of contents and is specified in XML syntax. The first line specifies the magic words, type and versions of the required parser, followed by the size, the addresses of the beginning and end of image tail, etc.

4) The rest of packets are self-contained with a header, data area and footer. A packet starts with a header, which specifies how to interpret the following data (text, binary, public, audio, video, segmentation map, thumbnail, hyperlink, programs, etc), followed by the data itself, and optionally ended by a footer with special markers. The packets can have fixed or variable sizes. For example, an audio clip can be fit into an audio packet and stored as wave format.

5) The end packet should address the links with image header, image data and/or other parts of the image file.

The invention has been described in detail with particular reference to certain preferred embodiments thereof, but it will be understood that variations and modifications can be effected within the spirit and scope of the invention.

Parts List 10 image description
12 image header
14 image data
16 image tail
18 standard image decoder
19 image data and standard description
20 enhanced image decoder
22 image tail decoder
24 non-standard meta data

What is claimed is:

1. A method of detecting the existence of an image tail in an image data description having a header defined by a standard, image data encoded according to the standard after the header, and an image tail containing non-standard meta-data at the end of the image data, comprising the steps of:
 a) detecting the end of the image data;
 b) detecting an end of file; and
 c) comparing the location of the end of the meta data to the location of the end of the file to determine the existence of the image tail when the end of file occurs after the end of the image data.

2. The method of claim 1, wherein the non-standard meta-data relates to the image content or the image capture, storage, transmission, processing, organization, display and printing conditions of a digital image contained in the digital image data.

3. The method claimed in claim 1, wherein the image tail is digital audio data.

4. The method of claim 1, wherein standard is selected from the group comprising JPEG, GIF, BMP, DIB, EXIF, PCD and TIFF.

5. The method of claim 3 wherein the digital audio data is in a format selected from the group comprising audio CD format, Microsoft wave format, MPEG audio format, Apple/SGI aiff format, and Sun/NeXT audio format.

6. The method of claim 3 wherein the digital audio data is data representing speech annotation, music, background sound, radio broadcasting or other audio content related to the image content or events of when, where, who.

7. The method of claim 1 wherein the image tail is data relating to a newer standard which can be used to make the newer standard backward compatible with the standard.

8. The method of claim 7, wherein said newer standard is a digital audio description in EXIF, and said standard is selected from the group comprising JPEG, GIF, and BMP.

9. The method claimed in claim 1, wherein the end of the image data is determined by a marker.

10. The method claimed in claim 1, wherein the end of the image data is determined by size information of the image data in the image header.

11. The method claimed in claim 1, wherein the image tail is image color space compression residue.

12. The method of claim 1 wherein said end of said image data has an end marker defined by said standard.

13. The method of claim 1 wherein said end of said image data is specified in said header.

14. The method of claim 1 wherein said end of said image data is specified by a starting address and size in said header.

15. A digital image decoding system, comprising:
 a standard image decoder for decoding a standard image header and image data encoded according to the standard;
 an image tail decoder for decoding an image tail having non-standard meta-data and occurring after the image data; and
 a detector detecting an end of the image data and an end of said image tail and responsive to said detecting, comparing locations of said ends to determine the existence of said image tail when said ends are separated.

16. The system claimed in claim 15, wherein the image tail is digital audio data.

17. The system claimed in claim 15, wherein the image tail is image data compression residue.

18. The system of claim 15 wherein said end of said image data is defined by the standard.

19. The system of claim 18 wherein said end of said image tail is an end of file.

* * * * *